Nov. 7, 1950     E. P. BULLARD, III     2,528,736

CONTROL MECHANISM

Filed June 24, 1944     6 Sheets-Sheet 1

INVENTOR
EDWARD P. BULLARD, III
BY
*Paul M. Rist*
ATTORNEY

Nov. 7, 1950 — E. P. BULLARD, III — 2,528,736
CONTROL MECHANISM
Filed June 24, 1944 — 6 Sheets-Sheet 2
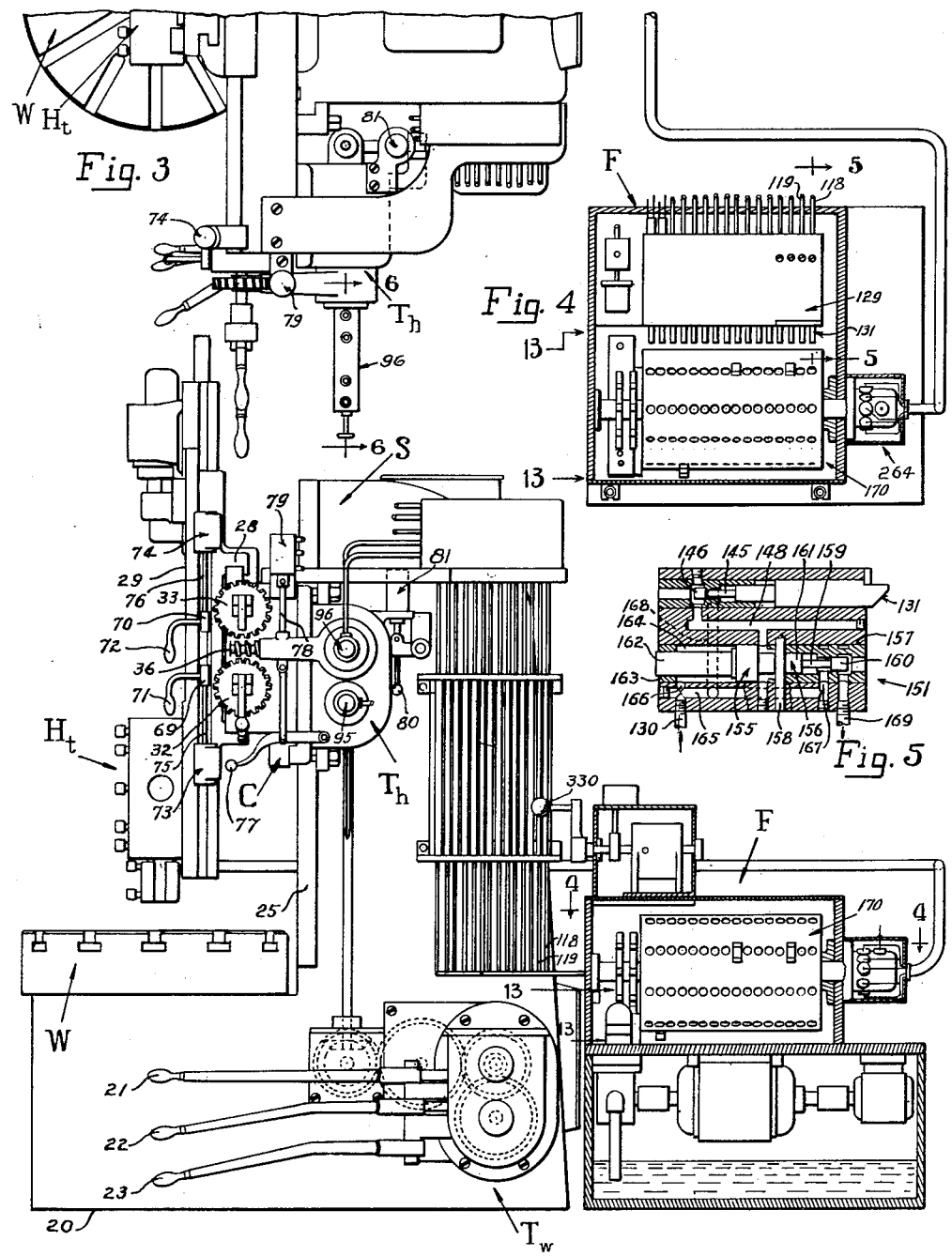
INVENTOR
EDWARD P. BULLARD, III
BY
ATTORNEY Nov. 7, 1950 E. P. BULLARD, III 2,528,736
CONTROL MECHANISM
Filed June 24, 1944 6 Sheets-Sheet 3
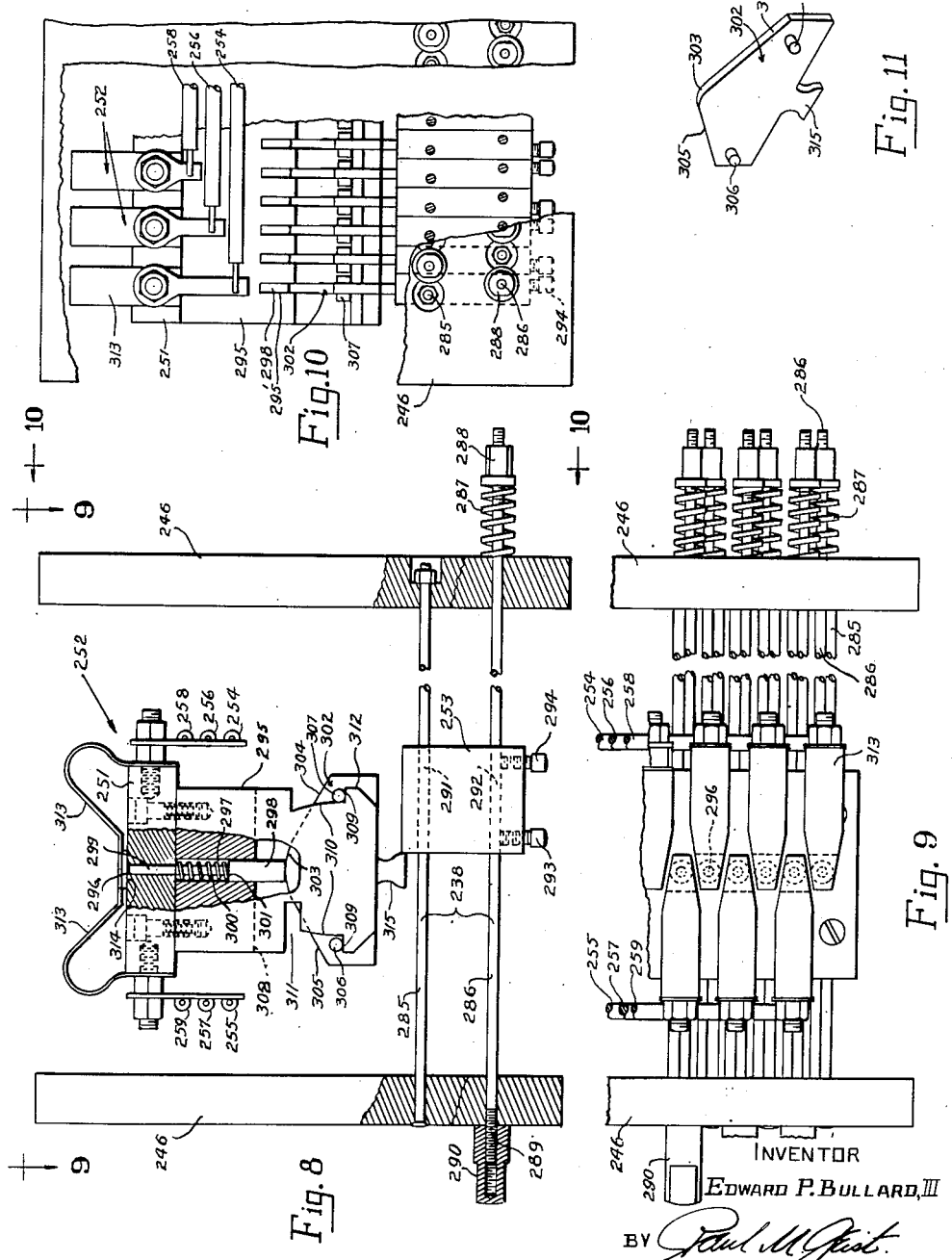
INVENTOR
Edward P. Bullard, III
BY Paul M. Geist
ATTORNEY

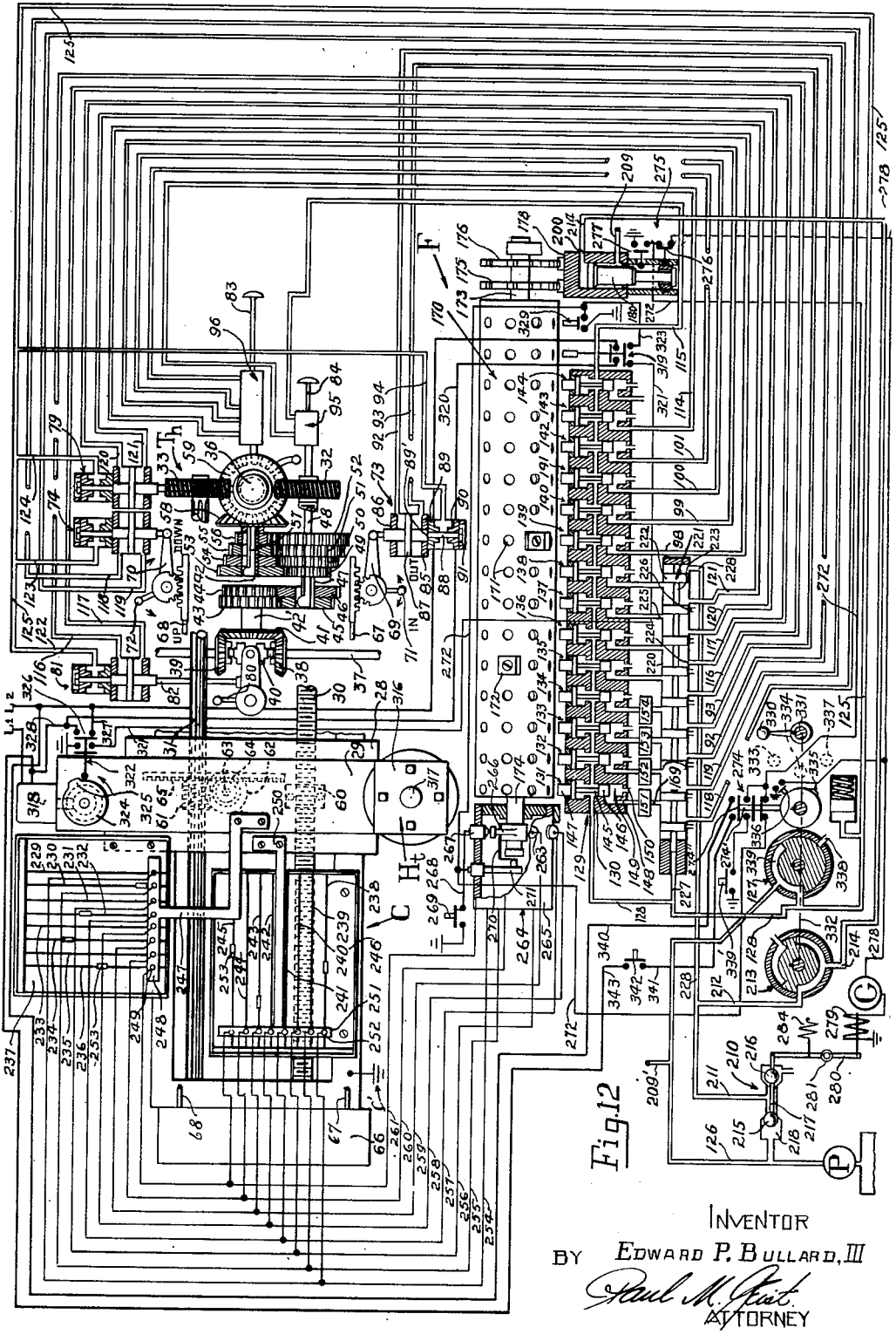

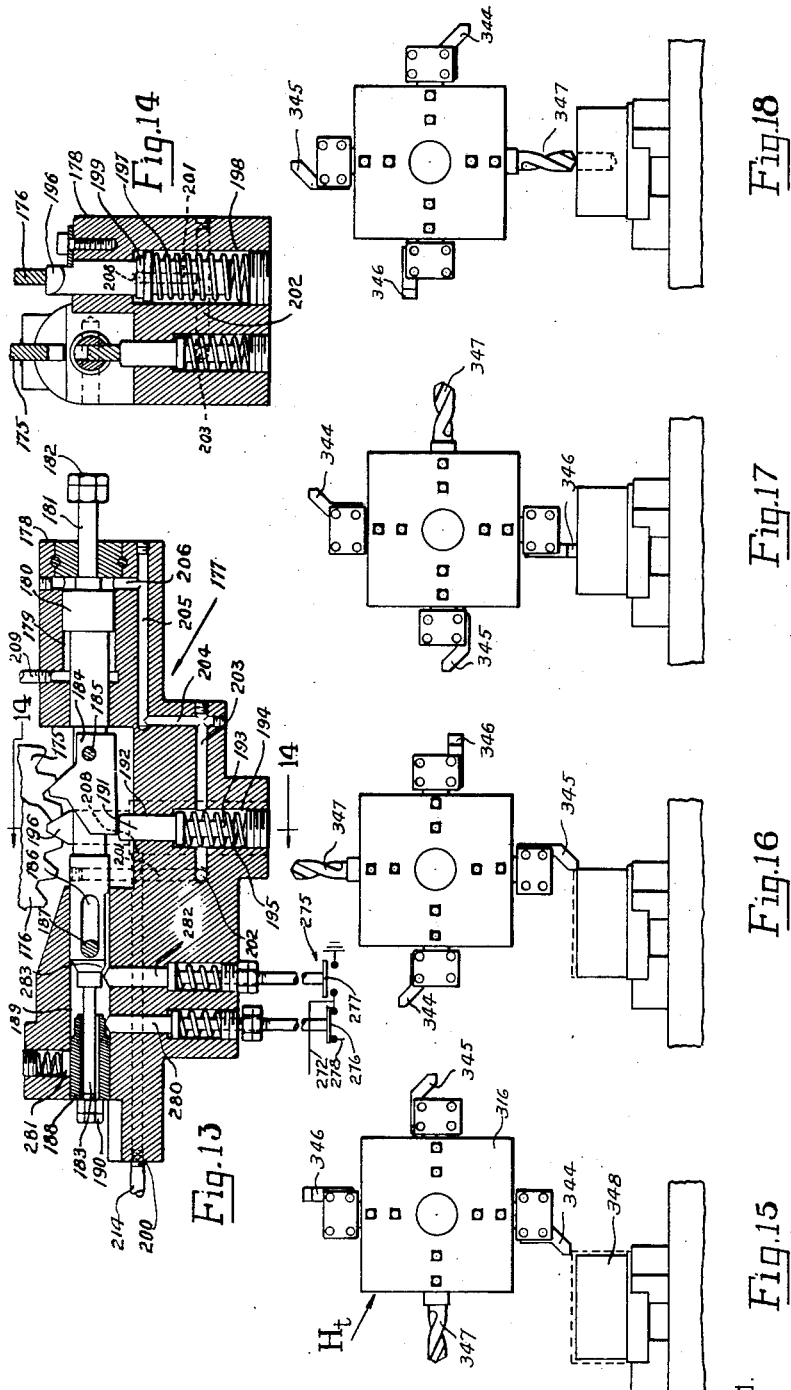

Nov. 7, 1950   E. P. BULLARD, III   2,528,736
CONTROL MECHANISM
Filed June 24, 1944   6 Sheets-Sheet 6

INVENTOR
EDWARD P. BULLARD, III
BY
ATTORNEY

Patented Nov. 7, 1950

2,528,736

UNITED STATES PATENT OFFICE 2,528,736

CONTROL MECHANISM

Edward P. Bullard III, Fairfield, Conn., assignor to The Bullard Company, a corporation of Connecticut Application June 24, 1944, Serial No. 541,986

22 Claims. (Cl. 192—142)

This invention relates to controls for apparatus capable of producing a relatively large number of functions. Particularly, it relates to a control mechanism that will automatically select, in any order within a cycle of operation any one or more functions of which an apparatus is capable, while providing separate means for very accurately determining the extent of each of said functions.

Ordinarily, the accuracy that can be obtained in the operation of machine tools, and particularly in the automatic-cycle operation of machine tools is limited by the accuracy that can be obtained with certain essential elements of the automatic control. For example, when electrical circuits are employed to control the movement of a member, the accuracy that can be obtained is limited by the accuracy of the operating parts of the electrical circuit, and particularly by the accuracy of those parts which are utilized repeatedly to effect stopping of the movement of the member such as trip switches. Machine tool operation requires an accuracy, in stopping the movement of a tool, in the nature of .0005 of an inch. Not only must such accuracy be produced, but it must consistently be maintained regardless of the rate at which the tool is being fed. Prior known electrical equipment including contact-making circuits for controlling the movement of a tool fails to produce accuracies of the order required in machine tool control as set forth above. This is primarily true because detrimental arcing between critical contacts of such equipment produces a molten condition on the contact surfaces, thereby changing the point at which such contacts subsequently make the circuit. In order to overcome this condition, by reducing to a minimum the duration of such detrimental arcing, prior known switches employ a quick, wide separation of the contacts when it is desired to de-energize such a control circuit. A wiping action between contacts while separating them is also employed to smooth the rough contact surface caused by the molten condition due to detrimental arcing. These prior known switches often employ metal-flexing members that are operated in response to tool movement for producing the quick wide separation of contacts. The accuracy of such constructions is limited because the metal-flexing members fail to respond at exactly the same point of tool movement upon repeated operations under the same conditions.

Objects of the present invention include the provision of a control mechanism for cycle-operating apparatus of the type that involves means adapted repeatedly to be moved along one or more paths in any order and for any distance; the provision of a control mechanism for a machine including means capable of performing a multiplicity of functions, wherein the control is adapted to render said means fully automatic, but still preserve its manual operativeness; and the provision of a control mechanism for a machine of the type that involves means adapted repeatedly to be moved along one or more paths for different overlapping distances within a cycle of operation.

Other objects of the invention include the provision of an electrical control circuit that can be energized repeatedly by the engagement between movable contact elements at exactly the same point relatively to each contact element; the provision of such an electrical control circuit wherein the surfaces of the energizing contact elements are not altered by continued repetitive use, by detrimental arcing or wear due to a sliding action; the provision of such an electrical control circuit in which the energizing contact elements can be brought into engagement as slowly as desired to energize the circuit without detrimental arcing; the provision of such an electrical control circuit that is de-energized before the contact elements are separated that are employed for energizing it; the provision of an electrical control circuit including a plurality of circuit-energizing contacts, each including movable contact elements, that are successively connected into the circuit and each of which embodies the above-noted characteristics; the provision of such an electrical circuit that is energized by the engagement between one set of contact elements and de-energized by the separation of another set of contact elements, and in which the contact elements of the first set are separated after the separation of the elements of the second set and the provision of an electrical control circuit for a multi-function apparatus wherein the duration of each function is determined by the engagement of separate circuit-energizing contact means that are successively connected into the circuit and in which said circuit embodies all of the above-noted characteristics.

Other objects include the provision of apparatus capable of a relatively large number of functions which embodies means for selecting in any order, a relatively great number of any of said functions within a cycle of operation and including separate electrical switch-means for each function within said cycle of operation; the provision of such an apparatus in which each switch is arranged in cooperative position relatively to a separate switch-actuating dog, and in which cooperation between the two is responsive to a function of the apparatus; the provision of such an apparatus wherein the relatively great number of switches and dogs is so constructed that a maximum number is included in a minimum of space; the provision of such an apparatus wherein the switches are actuated by relative movement between them and their dogs in response to the functions of the apparatus; the provision of such an apparatus in which each switch includes single contact means having movable contact elements operable to energize a circuit by the action of a dual-directional-motion actuator; the provision of such an apparatus wherein each switch is so constructed that cooperative abutting engagement between it and its dog occurs completely within a surface of the dog at right angles to the direction of relative movement between the switch and its dog; and the provision of such an apparatus in which each switch employs means for multiplying the relative motion between it and its dog and transmits such amplified motion to the single-contact means through rigid compression members.

Another specific obect of the invention is the provision of a control for a machine tool of the pre-settable cycle-operating type involving control means that is moved from position to position for selecting successive functions within a cycle of operation, and wherein the functions are terminated independently of the movement of the control means.

The above, as well as other objects and novel features of the invention, will become apparent from the following specification and accompanying drawings, in which:

Figure 2 is a side elevational view of the machine tool shown in Figure 1;

Figure 3 is a partial top plan view of the machine tool shown in Figures 1 and 2;

Figure 4 is a sectional plan view taken substantially along line 4—4 of Figure 2;

Figure 5 is a sectional elevational view taken substantially along line 5—5 of Figure 4;

Figure 8 is an enlarged sectional view taken along line 8—8 of Figure 1;

Figure 9 is a plan view taken along line 9—9 of Figure 8;

Figure 10 is an elevational view taken along line 10—10 of Figure 8;

Figure 11 is a detail of the apparatus shown in Figure 8;

Figure 12 is a schematic layout of the essential features of the invention;

Figure 13 is a sectional view taken substantially along line 13—13 of Figures 2 and 4;

Figure 14 is a sectional view taken substantially along line 14—14 of Figure 13;

Figures 15, 16, 17 and 18 are views showing the position of the tool turret at successive points in a cycle of operation;

Figure 1:
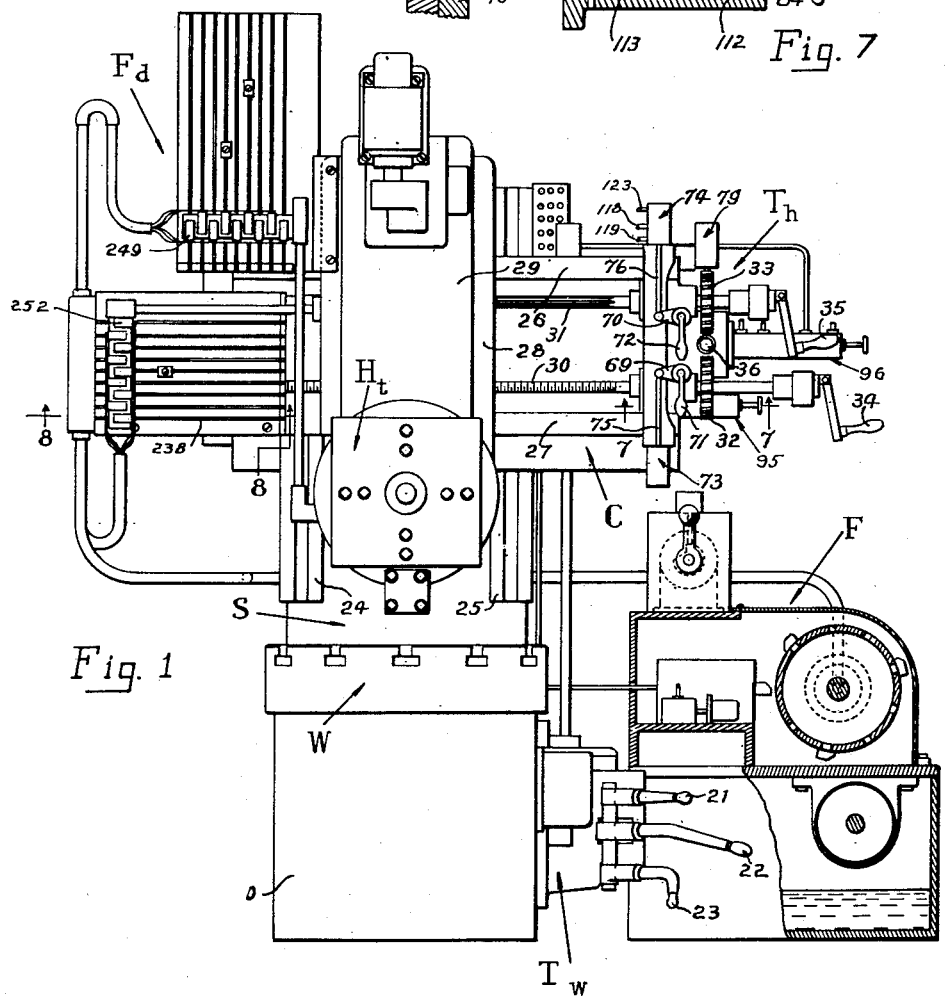
Figure 1 is a front elevational view of a machine tool embodying the principles of this invention.

Referring to Figures 1 and 2, the principles of the invention are shown as applied to a vertical-turret lathe including a standard S on which is mounted a horizontally-disposed work-supporting table W adapted to be rotated at a plurality of speeds by a headstock transmission $T_w$. The standard S is adapted also to support a cross rail C on which is mounted a turret head $H_t$ that is adapted to be moved along a pair of intersecting paths by the operation of a feedworks transmission $T_h$ that receives its power from the headstock transmission $T_w$.

The movement of the turret head $H_t$ along either of its paths, as well as its indexing movement to present different tools to the work, are adapted automatically to be controlled by the operation of a control mechanism F. The control mechanism F selects and initiates the functions desired of the turret head $H_t$. An auxiliary control $F_d$ is provided for determining the extent of each function selected and initiated by the control F.

The standard S includes a base 20 on which is mounted the work-supporting table W. The base portion 20 also includes an opening for the reception of the transmission $T_w$. The specific construction of the transmission $T_w$ is not necessary to a complete understanding of the invention. It is adapted to be operated by actuating levers 21, 22 and 23 for changing the output speed thereof. Suffice to say that the transmission $T_w$ is adapted to rotate the work-supporting table W at any one of a plurality of speeds. The specific construction of the transmission $T_w$ is similar to that shown and disclosed in Patent No. 1,172,341, dated February 22, 1916, to Edward P. Bullard.

The standard S includes vertically-disposed bearings 24 and 25 along which the cross rail C is adapted to be moved. The cross rail C includes two horizontally-disposed bearing surfaces 26 and 27 along which a saddle 28 is adapted to be moved. The saddle 28 includes vertically-disposed bearings for receiving a slide 29 that is adapted to be moved at an angle to the movement of the saddle 28. Horizontal movement of the saddle 28 is effected by the rotation of a screw 30 mounted in the cross rail C. Movement of the slide 29 is effected by the rotation of a splined shaft 31 parallel to, and also mounted on the cross rail C. The outer end of screw 30 supports a worm gear 32 and a similar worm gear 33 is fixed to the outer end of splined shaft 31. Hand cranks 34 and 35 are provided adjacent the gears 32 and 33 for manually turning the screw 30 and the shaft 31. A worm 36 is located between the two gears 32 and 33. It is adapted to be rotated in either direction at any one of a plurality of speeds by the feedworks transmission $T_h$. Accordingly, it is only necessary to move the worm 36 upwardly into engagement with the gear 33 in order to provide movement of slide 29 along the bearings formed in the saddle 28, and to lower worm 36 into engagement with gear 32 to provide movement of the saddle 28 along the cross rail C.

Referring to Figure 12, the feedworks transmission $T_h$ includes a shaft 37 that is driven by the headstock transmission $T_w$, Fig. 1. The shaft 37 supports two bevel gears 38, 39 for free rotation. A clutch 40 is located between the gears 38 and 39 and it is splined to the shaft 37. Both gears 38 and 39 mesh with a bevel gear 41. The gear 41 is fixed to a shaft 42'. Spur gears 43 and 44 are fixed to the shaft 42' and they mesh with corresponding gears 45 and 46 journaled on a shaft 47. The shaft 47 is hollow and a diving key 48 extends thereinto. The key 48 is adapted to be moved from engagement with gear 45 to engagement with gear 46 selectively for a purpose to be described later. Spur gears 49, 50, 51 and 52 are fixed to the tubular shaft 47. Spur gears 53, 54, 55 and 56 are journaled on another shaft 42. The portion of shaft 42 on which gears 53 to 56 are journaled is of tubular construction for receiving a diving key 57. A bevel gear 58 is fixed to the end of shaft 42 and it meshes with a bevel gear 59 fixed to the worm 36. From the foregoing it is evident that worm 36 may be rotated in either direction at any one of eight different speeds depending upon the positions of diving keys 48 and 57 and clutch 40.

Referring to Figure 12, the screw 30 threads into a boss 60 on the back of the saddle 28. The splined shaft 31 supports a worm 61 for sliding movement therealong. The worm 61 meshes with a worm wheel 62 on the back of saddle 28. The worm 62 is fixed to a shaft 63 that also supports a spur gear 64 in mesh with a rack 65 on the back of the slide 29. The shaft 63 is journaled in bearings on saddle 28. Rotation of screw 30, therefore, moves saddle 28 and slide 29 horizontally and rotation of splined shaft 31 moves slide 29 along the bearings formed therefor in saddle 28. Accordingly, moving worm 36 into engagement with the gears 32 and 33 will cause the movement of head H$_t$ along its respective paths in either direction at any one of eight different speeds depending upon the positions of clutch 40, key 48 and key 57.

A housing 66 is attached to the end of the cross rail C opposite that end which supports the feedworks T$_h$. This housing is adapted to support continuously-driven oppositely-rotatable means that is adapted to be connected to and disengaged from the screw 30 and the splined shaft 31 by the selective operation of rods 67 and 68. These rods are axially movable by the oscillation of crank arms 69 and 70. This construction provides means for moving the turret head H$_t$ along either of its paths at relatively fast traverse speeds.

Referring to Figures 1 and 2, the crank arms 69 and 70 are adapted manually to be operated by hand levers 71 and 72. These crank members are also adapted to be hydraulically actuated by pistons within cylinders 73 and 74. The pistons within these cylinders are connected to the crank members 69 and 70 by the connecting rods 75 and 76, respectively. The worm 36 is adapted manually to be moved into and out of engagement with gears 32 and 33 by the hand lever 77 fixed to a connecting rod 78 (Fig. 2) which latter is connected to a piston in a cylinder 79. Referring to Figures 2 and 12, the reversing clutch 40 is adapted manually to be moved by a hand lever 80 fixed to the clutch 40. Clutch 40 is adapted hydraulically to be actuated by a piston within a cylinder 81 which is connected to the clutch 40 by a link 82. The diving key 57 is adapted manually to be moved by the hand lever 83, while the diving key 48 is manually operable by the hand lever 84.

Referring to Figure 12, the piston and cylinder constructions 73, 74, 79 and 81 are the same and, therefore, only one will be described. The cylinder 73 includes a dividing partition 85 that cooperates with an end 86 to support piston 87. The piston 87 includes end portions that extend through the partition 85 and the end portion 86. A rod 88 fixed to the piston 87 extends beyond the partition 85 into another chamber of cylinder 73. Oppositely-disposed discs 89 and 90 are mounted on the rod 88 for free movement relatively to said rod. A nut 91 is screwed onto the end of the rod 88 in engagement with the disc 90. The disc 89 abuts against a shoulder 89' between rod 88 and the one end portion of piston 87. Fluid under pressure is adapted to be selectively admitted to opposite faces of piston 87 through conduits 92 and 93. Constant pressure is adapted to be supplied through a conduit 94 to the chamber of cylinder 73 that contains the discs 89 and 90. The effective pressure-area of the discs 89, 90 is less than the effective pressure-area of the piston 87. Consequently, admission of pressure to the cylinder 73 through either of the lines 92 and 93 will cause the piston 87 to move within the cylinder 73. Removal of pressure from both lines 92 and 93 will effect the instantaneous centralization of the piston 87 within the cylinder 73. This construction provides means for positively moving the cranks 69, 70, clutch 40 and worm 36 to their active positions and causes neutralization of each of these elements upon removal of the pressure from the corresponding pistons thereof.

Figure 6:
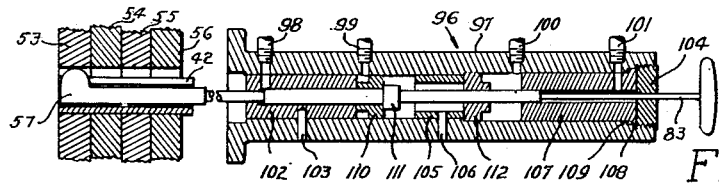
Figure 6 is a sectional plan view taken along line 6—6 of Figure 3.

The diving keys 48 and 57 are adapted hydraulically to be actuated by cylinder mechanisms 95 and 96. Referring to Figure 6, the cylinder mechanism 96 is designed to selectively move the key 57 to any one of four positions so that either of gears 53, 54, 55 or 56 may be keyed to the shaft 42 for imparting a specific speed of rotation to the worm 36.

Referring to Figure 6, the cylinder mechanism 96 includes an outer cylinder 97 having fluid conduits 98, 99, 100 and 101. It includes an end abutting member 102 that is fixed within the cylinder 97 by a pin 103. At the other end of the cylinder 97 a plug 104 is attached through which the lever 84 extends. Centrally of the cylinder 97 a sleeve 105 is fixed by a pin 106. Another abutting portion 107 is fixed in the cylinder 97 by a flange 108 that engages a shoulder 109 in the cylinder 97 and which portion 107 is held in place by the plug 104. A movable piston member 110 is located between the fixed abutment member 102 and the fixed sleeve 105. The piston member 110 is adapted to abut a flange 111 formed on the key 57. Another movable piston 112 is located in the cylinder 97 between the fixed sleeve 105 and the abutting member 107. The construction and arrangement of the parts are such that admission of fluid under pressure to the conduit 98 causes the movement of the key 57 rightwardly, as viewed in Figure 6, until the flange 111 engages the piston member 112 and forces the latter into abutting relation with the member 107. This locates the key 57 such that spur gear 56 is keyed to the shaft 42. Simultaneous admission of fluid under pressure to the conduits 98 and 100 will cause the piston member 112 to move into engagement with the right-hand end of fixed sleeve 105 with the flange 111 in abutting relation to said piston 112. This will locate key 57 such that spur gear 55 is keyed to the shaft 42. Simultaneous admission of fluid under pressure to the conduits 101 and 99 will cause the movement of key 57 leftwardly until flange 111 abuts against piston 110 and piston 110 abuts against the left-hand end of sleeve 105. This condition will locate key 57 such that spur gear 54 is keyed to shaft 42.

Finally, admission of fluid under pressure to conduit 101 alone will move the key 57 leftwardly such that flange 111 abuts piston 110 and piston 110 abuts member 102. This condition will locate key 57 such that spur gear 53 is keyed to the shaft 42.

Figure 7:
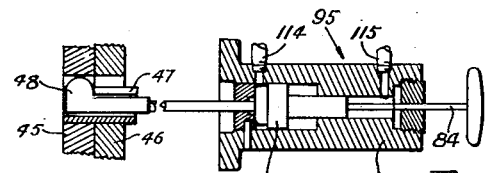
Figure 7 is a sectional plan view taken along line 7—7 of Figure 1.

Referring to Figure 7, the cylinder mechanism 95 includes a cylinder 112 within which a differential piston 113 is adapted to be reciprocated. The piston 113 is fixed to the diving key 48. The cylinder 112 is provided with conduits 114 and 115. The construction and arrangement of the parts are such that admission of fluid under pressure to conduit 114 only, moves piston 113 rightwardly, as viewed in Figure 7, positioning key 48 such that spur gear 46 is keyed to shaft 47. Release of pressure from conduit 114 causes piston 113 to move leftwardly, as viewed in Figure 7, such that spur gear 45 is keyed to shaft 47 because conduit 115 is always under pressure as will be explained later.

Referring to Figure 12, fluid under pressure is adapted selectively to be supplied to the piston mechanism 81 through conduits 116 and 117. Fluid pressure is adapted to be supplied to the piston mechanism 74 through conduits 118 and 119. Fluid under pressure is adapted to be supplied to the piston mechanism 79 through conduits 120 and 121. Fluid under constant pressure is adapted to be supplied to piston mechanisms 81, 74 and 79 through conduits 122, 123 and 124, respectively. This constant pressure fluid is supplied to the conduits 122, 123 and 124, as well as to the conduit 94 by a pipe 125 that leads from a main source of fluid supply P through a duct 126 and a valve 127.

Conduits 92, 93, 98, 99, 100, 101, 114, 115, 116, 117, 118, 119, 120 and 121 are adapted to be supplied with fluid under pressure from the main source P by a pipe 128 that leads from valve 127 and is connected to an elongated valve body 129. The valve body 129 is provided with a centrally-disposed longitudinally extending passage 130 throughout its length. It is also provided with a plurality of transversely-disposed valve chambers of identical construction within which are located valve plungers 131 to 144, inclusive, for conduits 92, 93, 98, 99, 100, 101, 114, 116, 117, 118, 119, 120 and 121. Valve plunger 144 is employed as a spare and is not shown connected to a conduit. Since all the valve plungers 131 to 144 are identical, only plunger 131 will be specifically described. It comprises a valve stem 145 having a valve head 146 at its lower end and an upper head 147 at its upper end. The area of the head 146 is substantially less than that for the head 147. Consequently, the constant supply of fluid under pressure within the valve body 129 maintains the plunger 131 in its upper position. With plunger 131 in its upper position, the lower head 146 prevents the passage of fluid under pressure through a discharge duct 148 which is connected to the conduit 118. Upon downward movement of the plunger 131, the head 146 thereof moves into a chamber 149 having an exhaust 150, whereupon fluid from line 128 may pass said head and empty into duct 148.

The conduits 118, 119, 92 and 93 control the operation of the arms 70 and 69, respectively, for rendering effective the quick traverse movement of the head Ht. During a machining operation it is necessary to provide a dwell at the end of any feeding operation for the purpose of cleaning up the work. Accordingly, time delay mechanisms 151, 152, 153 and 154 are provided between the valve body 129 and the conduits 118, 119, 92 and 93. Since each of these mechanisms is identical, only the mechanism 151 will be specifically described. Referring to Fig. 5, the time delay mechanism 151 includes a differential piston mechanism comprising pistons 155 and 156 operating in a differential cylinder 157. A stationary rod 158 intersects the cylinder 157 and serves as an abutment against which pistons 155 and 156 are adapted to rest. The piston 156 is provided with a piston rod 159 to the one end of which a head 160 is attached, and to the other end of which a head 161 is attached. The piston 155 includes a portion 162 of reduced diameter which forms with a collar 163 a chamber 164. The fluid under pressure passes from the pipe 138 into the valve body 129, Fig. 12, and as shown in Fig. 5, it supplies fluid pressure to a duct 165 having an opening 166 into the chamber 164 and an opening 167 into a chamber formed by the upper and lower heads 160, 161 of the piston 156. A duct 168 extends from the duct 165 to the chamber in which head 146 of plunger 131 acts. The construction and arrangement of parts are such that fluid pressure at all times tends to move the pistons 155 and 156 into engagement with abutment 158 and also supplies through duct 168, fluid under pressure for operating the time delay mechanism. Inward movement of the plunger 131 moves the head 146 such that the fluid under pressure from duct 168 passes through duct 148 into the space between pistons 155 and 156. The cross-sectional area of piston 155 is substantially greater than that of the head 161 for piston 156. Consequently, piston 155 moves outwardly away from the abutment 158, while the piston 156 remains in engagement therewith. When piston 155 has moved outwardly its maximum extent, that is, when its head has engaged the collar 163, piston 156 moves outwardly, whereupon its head 160 opens duct 167 to the outlet 169 which latter is connected to the conduit 118. Accordingly, upon each downward movement of the plunger 131, there will be effected a time delay before the fluid under pressure from line 128 passes to conduit 118.

The plungers 131 to 144, inclusive, Fig. 12, are adapted selectively to be depressed by the step-by-step rotation of a function drum 170 about a horizontal axis. The drum 170 is provided with a series of circumferentially-disposed openings 171 forming means whereby dogs 172 can be attached to said drum. There is a series of such holes 171 in line with each of the plungers 131 to 144, inclusive, as well as other such series of openings for purposes to be described later. The drum 170 is shown in the form of a cylinder having trunnions 173 and 174 which are supported in the usual manner in bearings in the housing of the function control mechanism F. The drum 170 is adapted to be indexed a predetermined number of degrees about its horizontal axis intermittently so that the dogs located on the drum in a longitudinally-disposed row of openings 171 will become effective to depress the selected plungers 131 to 144, thereby to operate the machine in a manner to be described later. Ratchet wheels 175 and 176 are fixed to the trunnion 173 of the drum 170. The ratchet wheel 175 is employed to index the drum 170, while ratchet wheel 176 serves as a retaining means for locking the drum 170 in each of its indexed positions.

Referring to Figs. 13 and 14, the ratchet wheels 175 and 176 are actuated by a piston mechanism 177. It comprises a piston and valve body 178 having a cylinder 179 within which a piston 180 is adapted to be reciprocated. The piston 180 includes a tail rod 181 having an adjustable lock nut 182 fixed to its end for limiting the movement of the piston 180 in one direction. A piston shaft 183 extends from piston 180 in a direction opposite that of the tail rod 181 and supports a pawl 184 pivotally mounted to it by a pin 185. The forward end of the shaft 183 is provided with an elongated slot 186 through which a pin 187 extends that is anchored into the housing 178 to prevent rotation of the shaft 183 and piston 180. Forwardly of the slot 186, the shaft 183 is reduced in diameter and passes freely through a bushing 188 frictionally held within a bore 189 of the housing 178. The end of the reduced portion of shaft 183 has fixed to it an adjustable lock nut 190. The construction of the forward end of the shaft 183, as well as that of the sleeve 188, together with their functions, will be described later. The pawl 184 is adapted to be forced into positive driving engagement with the teeth of ratchet wheel 175 by a piston mechanism 191, not only to insure positive meshing between the two, but also to prevent overtravel of the ratchet wheel 175. The piston 191 is mounted for reciprocation in a bore 192 within the housing 178. The piston includes a reduced portion 193 within a chamber 194 of the bore 192 and around which a compression spring 195 is located.

Referring to Fig. 14, the ratchet wheel 176 is adapted to be engaged by a spring pressed detent 196 that is urged into locking engagement by a compression spring 197 within a bore 198 of housing 178. The detent 196 is provided with a piston head 199 against which spring 197 reacts. Fluid under pressure is adapted to be admitted to the bore 198 above the piston 199 intermittently in timed relation with the operation of the piston 180 for releasing the ratchet wheel 176 at the time ratchet wheel 175 is indexed by the piston 180. Fluid under pressure is adapted intermittently to be supplied to the inlet 200 from the conduit 214, Fig. 12. Inlet 200 is provided with a branch 201 that connects with conduits 202, 203, 204, 205 and 206, the last of which enters the chamber 179 within which piston 180 is adapted to be reciprocated. Referring to Fig. 14, a branch conduit 208 extends from the conduit 200 to the bore 198 above piston 199 therein. Constant pressure is adapted to be supplied to an inlet 209 from the source P through a branch 209' (see Fig. 12). This inlet 209 is connected to the chamber 179 on the opposite side of the piston 180 from that to which inlet 206 admits fluid under pressure. The effective area of the piston 180 that is subjected to the constant pressure from inlet 209 is substantially less than that subjected to the intermittent pressure from inlet 206. Accordingly, admission of the pressure from inlet 206 moves piston 180 to the left, as viewed in Fig. 13, and upon release of such pressure, piston 180 moves rightwardly due to the constant pressure from inlet 209.

Since the conduit 203 crosses bore 194 beneath piston 191, intermittent supplying of fluid through the conduit 200 forces the piston 191 upwardly thereby moving pawl 184 into positive driving engagement with the teeth of ratchet 175. At the same time, this same fluid passes from inlet 200 through branch 208 to the chamber 198 above piston 199, retracting the detent 196 thereby releasing the ratchet wheel 176. At the same time, this same fluid under pressure passes through conduits 201, 202, 203, 204, 205 and inlet 206 to the right-hand side of piston 180, as viewed in Fig. 13, causing the piston 180 to move leftwardly to index the ratchet wheel 175 and with it function drum 170. Interruption of the fluid under pressure to conduit 200 permits piston 180 to move rightwardly, causes detent 196 to move upwardly into locking engagement with ratchet wheel 176 by spring 197, and removes the pressure from the piston 191.

Referring to Fig. 12, pressure from a main source P branches off from the line 126 through a valve 210, lines 211, 212, a manually operable valve 213 to be described later, and a conduit 214 that is connected to the inlet 200 of the housing 178. The valve 210 comprises ball members 215, 216 that are joined by a slender rod 217. The balls 215 and 216 are adapted to seat in a valve body 218 to prevent the passage of fluid thereby. The construction and arrangement of parts are such that when ball 215 is engaged with its seat, ball 216 is out of engagement with its seat, and vice versa. Accordingly, movement of the balls 215, 216 to the left, as viewed in Fig. 12, will permit fluid under pressure to be admitted through lines 211, 212, manually operable valve 213, line 214, to inlet 200 from which it passes to inlet 206 (Fig. 13) as previously described. Upon release of the force moving balls 215 and 216 to the left, as viewed in Fig. 12, they will move to the right under the combined influence of the pressure from the source P acting against the ball 215 and a spring 284, thereby cutting off the flow of fluid under pressure to the inlet 200. The constant supply of pressure to inlet 209 is supplied from the branch conduit 209'.

From the foregoing, it is evident that the intermittent operation of the valve 210 will cause the intermittent indexing of the function drum 170 to effect the depression of selected of the valves 131 to 144 for controlling the operation of the machine tool. In order to reduce to an absolute minimum the time required to exhaust the valve piston mechanisms 81, 74, 79 and 73, means is provided for effecting their exhaust independently of the indexing of the function drum. If the exhausting of these piston mechanisms were effected by the upward movement of the valve members 131 to 144, instantaneous action could not be obtained since a definite time interval is required in moving the drum from one position to the next. Accordingly, the present invention overcomes this difficulty by providing a unique valve mechanism between the piston mechanisms 73, 74, 79 and 81 and the valve body 129 including the time delay devices 151, 152, 153 and 154. This valve mechanism is designed to effect instantaneous exhausting of the piston mechanisms 73, 74, 79 and 81 independently of the action of the indexing mechanism for the function drum 170. It comprises an elongated bore 220 within which a plurality of independent piston members 221 is adapted to be reciprocated for a limited distance. Each of the piston members 221 is identical and comprises a head portion 222 and a stem portion 223. They are arranged in aligned abutting relation. The bore 220 is provided with a plurality of ports 224 to which the conduits 118, 119, 92, 93, 116, 117, 120 and 121 are connected. It is also provided with a plurality of inlets 225 to which the chambers for valves 131, 132, 133, 134, 135, 136, 137 and 138 are connected. The bore 220 is also provided with a plurality of exhaust ports 226. The construction and arrangement of parts are such that normally the piston members 221 are in abutting relation, as shown in Fig. 12, with their head portions 222 overlapping or covering the exhaust ports 226 and permitting free passage between the valve body 129 and the conduits 118, 119, 92, 93, 116, 117, 120 and 121. Constant pressure is supplied to the left-hand end of the bore 220 through a branch 227 of the conduit 128, normally maintaining the pistons 221 in the position shown in Fig. 12. A branch line 228 of the line 211 is connected to the right-hand end of bore 220 and acts upon the head 222 of the rightwardmost piston 221. Accordingly, upon the intermittent actuation of valve 210, the piston members 221 will be moved leftwardly such that the exhaust ports 226 will be uncovered and the inlet ports 225 will be covered. When this occurs, the conduits 118, 119, 92, 93, 116, 117, 120 and 121 will be instantly exhausted before indexing of drum 170 will take place by the action of the fluid under pressure in line 214. This construction greatly increases the accuracy of the feed knockout, as well as the traverse knock-out. That is, neutralizing of the feed and traverse clutches and drop worm 36 is instantly accomplished regardless of the time required to index drum 170.

That which has been described comprises selectively operable mechanism for causing the head Ht to produce any function of which it is capable in accordance with the operation of valves 131 to 144. The extent of any function selected by the drum 170 is adapted to be determined by mechanism associated with the movable head Ht. This mechanism is designed to provide a separate function determining means for each function called for by a setting of dogs 172 along a longitudinally-disposed row of openings 171 on drum 170. It comprises in the present embodiment, switch-trip supporting means 229 to 236, inclusive, one for each of the longitudinally-disposed rows of holes 171 on the drum 170. Although only eight such supporting means and eight longitudinally-disposed rows of dogs 172 on drum 170 are shown, it is to be understood that any number of such supporting means and longitudinal rows of dogs 172 may be employed. In practice, it has been found that about forty such supporting means and rows of dogs on drum 170 are adequate. The switch-trip supporting means are mounted on a panel 237 rigidly attached to the saddle 28 of the machine. Similarly, supporting means 238, 239, 240, 241, 242, 243, 244 and 245 are mounted on a panel 246 fixed to the cross rail C. An arm 247 is fixed to and movable with the slide 29 and includes a right-angularly disposed portion 248 having switches 249 above the supporting means 229 to 236, inclusive. An arm 250 is fixed to, and movable with the saddle 28 along the cross rail C and it includes a right-angularly disposed portion 251 having switches 252 above each of the supporting means 238 to 245, inclusive. The construction and arrangement of the parts are such that movement of slide 29 along the bearings in the saddle 28 will cause the switches 249 to move along means 229 to 236, inclusive, and horizontal movement of saddle 28 will cause the switches 252 to move along the means 238 to 245, inclusive.

Adjustably-mounted dogs 253 are adapted to be located along each of the supporting means 229 to 236 and 238 to 245, inclusive. The switch 249 above means 229 is connected to the switch 252 above means 238 by a common wire 254. Switches 249 and 252 above means 230 and 239 are connected by a common wire 255. Switches 249 and 252 above means 231 and 240 are joined by wire 256. Wire 257 joins switches 249 and 252 above means 232 and 241. Wire 258 joins switches 249 and 252 above means 233 and 242. Switches 249 and 252 above means 234 and 243 are joined by wire 259. Wire 260 joins switches 249 and 252 above means 235 and 244. Switches 249 and 252 above means 236 and 245 are joined by wire 261. The specific construction of the switches 249, 252 and the switch-tripping dogs 253 will be described later.

Each wire 254 to 261, inclusive, is connected to a separate contact 263 of a distributor 264 that is mounted about trunnion 174 of function drum 170. The contacts 263 are located about the periphery of a non-rotatable cylindrical member 265 of the distributor 264 such that wires 254 to 261 are successively adapted to be contacted by a brush arm 266 fixed to and rotatable with the drum 170. A binding post 267 is provided with the group of contacts 263 as the "no-function" position of the drum. The binding post 267 is provided with a line 268 having a manually operated push-button 269 between the binding post 267 and a ground connection for the purpose of initiating a cycle of operation as will be described later. The brush arm 266 includes a contact member 270 that is maintained in rubbing engagement with a fixed contact 271 to which another binding post is fixed and mounted in the non-rotatable cylindrical member 265 of distributor 264. The contact 271 is provided with a conductor 272 that extends through a switch 274, thence to a compound switch mechanism 275 adjacent the drum-indexing mechanism. The switch 275 includes a normally closed contact 276 and a normally open contact 277. The conductor 272 is connected to one pole each of the switches 276 and 277. The opposite pole of the switch 277 is grounded and the opposite pole of the switch 276 is connected by a conductor 278 that extends to and is connected with a source of electrical energy G. The source of energy G also is in series connection with a solenoid 279, the opposite side of which is grounded. The solenoid 279 is adapted upon energization to cause the pivoting of an arm 280 about a pivot 281 to operate the valve 210.

Operation of the switches 249 and 252 grounds the wire 254 to 261 that is connected to it, to create a circuit through the solenoid 279. Assume that brush 266 is in contact with the binding post 263 for the conductor 259 that is common to the switches 249 and 252 for the switch-trip supporting means 234 and 243, respectively. Further, assume that the head Ht is moving along one of its paths, for example, that defined by the bearings in the saddle 28. Since head Ht is not moving horizontally, no dog 253 will be employed on means 243. When the switch 249 above means 234 engages the dog 253 thereon, said switch will operate so that current will flow from the generator G through the conductor 278, the normally-closed switch 276 to the conductor 272, the normally-closed portion of switch 274, the contact members 271, 270, the brush 266, binding post 263, conductor 259, switch 249, thence to the ground C' on the frame of the machine, back to the one side of the solenoid 279 and finally to the generator G.

Energization of the solenoid 279 will cause the valve 210 to operate such that the balls 215, 216 move leftwardly, as viewed in Fig. 12, whereupon pressure from the source P is adapted to pass the ball 215, enter the conduit 211 and move the piston members 221 leftwardly, thereby to exhaust all of the lines 118, 119, 92, 93, 116, 117, 120 and 121. Such action will immediately neutralize all of the operating elements of the feedworks T$_h$. At the same time, this fluid under pressure will pass through branch 212, valve 213, conduit 214, and effect the indexing of the drum 170 to its next succeeding position. It will be observed, however, that as soon as the drum 170 begins to index, the brush arm 266 moves off the binding post 263, thereby removing the ground C' from the circuit including the solenoid 279. Accordingly, in order to effect a complete index of drum 170, it is necessary to provide a substitute for ground C' while the arm 266 is moving between successive binding posts 263. This is accomplished by the normally open switch 277 of the compound switch 275.

Referring to Fig. 13, the normally closed switch 276 comprises a spring pressed detent 280 normally held in depressed condition by the sleeve 188 within the bore 189. The sleeve 188 is frictionally maintained in position by a spring-friction member 281. The normally-open switch 277 comprises a similar spring pressed detent 282 that is adapted to be closed by the movement of the rod 183 of the plunger 189. The rod 183 includes, for this purpose, a cam surface 283 that upon leftward movement, depresses plunger 282 thereby closing switch 277 to provide a ground for C' which is eliminated when brush 266 moves off post 263. Continued movement of the rod 183 leftwardly may, therefore, occur causing the member 283 to abut against the one end of the sleeve 188, moving it outwardly and leftwardly so that detent 280 raises, effecting opening of switch 276. This abutting relation between cam 283 and sleeve 188 does not occur until the piston 180 has moved sufficiently to effect complete indexing of the drum 170, whereupon the switch 276 is opened, de-energizing the solenoid 279 and permitting spring 284 (Fig. 12) to move the balls 215 and 216 of valve 210 rightwardly thereby cutting off the flow of fluid under pressure to the conduit 211. Interruption of the flow of fluid under pressure through the line 211, valve 213 and line 214 causes the piston 180 to be returned to its normal position by the constant pressure from line 209' that enters the inlet 209 of the housing 178. Accordingly, piston 180 is positioned properly for its next succeeding index. During this rearward movement of piston 180, nut 199 engages sleeve 188 to return it to a position where it depresses detent 280 thereby closing switch 276. Just before switch 276 is closed, the portion 283 of rod 183 releases detent 282 permitting ground switch 277 to open.

As previously mentioned, the practical embodiment of the invention employs as many as forty or more means 238 that support dogs 253 and an equal number of longitudinally-disposed rows of openings 171 on drum 170. Accordingly, forty or more individual switches 252 are required, one for each switch-trip supporting means 238; and an equal number of switches 249 is also required for the trip-supporting means 229, etc.

Referring to Fig. 8, the uprights comprising frame 246 support the switch-trip supporting means 238 which includes a wire 285 rigidly fixed between the uprights of frame 246, and a wire 286 located in a vertical plane spaced from that including wire 285.

The wire 286 is mounted within openings in the uprights of the frame 246 in parallel relation to wire 285. The wire 286 is adapted to be axially moved for a purpose to be described later. A compression spring 287 surrounds the one end of the wire 286 outside of the frame 246. An adjustable nut 288 is threaded onto the end of rod 286 for varying the compression of the spring 287. The end of rod 286 opposite that supporting spring 287 extends through one upright of the frame 246 and is provided with a micrometer thread 289 and a micrometer nut 290. By turning the nut 290, the wire 286 may be axially moved in either direction since the spring 287 maintains a constant tension on the wire.

The dog 253 comprises a relatively narrow rectilinear body having passages 291 and 292 extending through it for the reception of the wires 285 and 286. Lock bolts 293 and 294 are threaded into the lower end of the dog 253. The bolts 293 and 294 abut against the wire 286. Loosening of bolts 293 and 294 will permit the adjustment of the dog 253 axially along the wires 285 and 286 for approximately locating the dog 253 in its correct position. Tightening of the bolts 293 and 294 will fix the dog 253 to the wire 286. With the dog fixed to the wire 286, accurate adjustment of the dog 253 relatively to the switch 252 may be effected by turning the micrometer nut 290 on the one end of wire 286. The micrometer thread 289 of the rod 286 that receives the nut 290 comprises 40 threads to the inch so that a complete turn of nut 290 will move dog 253 an amount equal to .025 inch. A dial is provided with each nut 290 of ten equal divisions so that it is possible accurately to move dog 253 an amount equal to .0025 inch, and it is possible to estimate movements of dog 253 of less than .001 inch.

Figures 8, 9, 10 and 11 show one switch 252 in detail with its attending parts. Since all switches 249 and 252 are identical, only one will be described in detail. In the present embodiment of the invention, the switch-supporting members 248 and 251 are moved over their respective switch-trip supporting means and said means remain stationary. Of course, whether the supporting means move or the switch supports move is immaterial, so long as relative motion between the two is provided.

The novel circuit includes a series connection between four essential elements including: (1) a source of voltage, which in the present embodiment is about thirty-two volts, and is represented by generator G, Fig. 12; (2) an electrically operated load device which in the present embodiment is solenoid 279; (3) electrical contacts adapted to be opened repeatedly by substantially an identical action, which comprises arm 266 of distributor 264; and (4) a circuit-energizing contact which, in the present embodiment, is operated in response to the movement of the tool turret and comprises switch 252. The operation of the circuit including these four essential elements must be such that contacts of distributor 264 are first closed which establishes the circuit as far as the corresponding circuit-energizing contact or switch 252. When the turret head reaches its destination, switch 252 is operated thereby energizing the circuit. Energization of the circuit operates the solenoid 279 which in turn actuates the valve 210 supplying fluid to piston mechanism 177 which in turn actuates arm 266 to de-energize the circuit. Finally, the circuit-energizing contact (switch 252) is opened only after its corresponding distributor contacts have been opened. The above-described operation of the circuit prevents detrimental arcing of the circuit-energizing contact (switch 252), which is the key to the accuracy of the control. Accordingly, the surfaces of the movable parts of the contact of switch 252 are never altered by melting due to arcing.

The member 251 which supports the switches 252 is composed of insulating material and is fixed to bracket 250 that is moved between the uprights of the frame 246 in response to the horizontal movement of head Ht. A metallic switch-supporting body 295 extending throughout the entire length of the insulating member 251 is rigidly bolted to it. The member 251 is provided with a plurality of holes 296 that extend through the member 251 and are aligned as shown in Fig. 9. The metallic body 295 is provided with an identical series of holes or bores 297 that are slightly larger in diameter, but axially aligned relatively to the holes 296. A plunger 298 is located in each of the holes 297 and includes a stem portion 299 that extends upwardly through the hole 296 in the insulating block 251. A coil spring 300 is located within the holes 297 between the block 251 and a shoulder 301 on the plunger 299. The lower end of the plunger 298 rests on an actuating member 302. The actuating member 302 is shown in Fig. 11 and comprises a flat plate having an arcuate portion 303 joined by tangential portions 304, 305 on each side thereof. The actuator 302 is also provided with trunnions 306, 307 that extend through and beyond the actuator 302 for equal distances on each side of said actuator. The lower portion of the body 295 is provided with a series of slots 295' each of which extends from the bottom of the member 295 upwardly to the dotted line 308. There is a slot 295' aligned with each of the holes 297 and plungers 298. The intersection between each of the slots 295' and its respective hole 297 forms a seat below which the lower end of plunger 298 will not move. A trunnion receiving portion 309 is provided on each side of the block 295 at the lower end of an arcuate surface 310. The one arcuate surface 310 is slotted at 311 for facilitating the assembly of the actuator 302. This assembly is accomplished by locating the trunnion 306 within the slot 311, thereby permitting the trunnion 307 on the opposite end of the actuator 302 to clear the shoulder 312 of the body 295 and become seated in its trunnion receiving portion 309. Seating of the trunnion 307 adjacent the shoulder 312 locates the opposite trunnion 306 beyond the slot 311 so that it is urged downwardly to its trunnion-receiving portion 309 by the action of the spring-pressed plunger 298. As shown in Fig. 8, a slight clearance is provided between the trunnions 306, 307 and the arcuate walls 310. This clearance is always taken up, as evidenced in Fig. 8 by the absence of clearance about trunnion 307, before the switch 252 is operated by dog 253.

The construction and arrangement of the parts of the switch 252 and its attending parts are such that a great number of switches 252 can be located within a minimum of space. The relatively thin, flat plates 302, together with the overall length of the trunnions 307 extending on both of its sides, need not exceed the maximum diameter of the plunger 298 whereby the only limitation on spacing of switches 252 is the necessary wall thickness between bores 297. In the present embodiment, the plungers 298 are located on $\frac{1}{32}$ inch diameters, which gives some idea of the number of switches 252 that can be located within a given space.

Spring conductors 313 are provided alternately on each side of the insulating member 251 such that their free ends overlie the tops of the holes 296 within which the portions 299 of the plungers 298 are located. Each of these free ends of the conductors 313 is provided with a hardened steel contact portion 314 directly over the holes 296. The spring 313 resiliently urges this contact firmly into engagement with the top of the rigid body member 251. A slight clearance is provided between the top of the stem portion 299 and the hardened steel contact 314. The fixed end of each conductor 313 is connected to one of the wires 254 to 261 that lead to the distributor 264.

Each of the actuators 302 is provided with a depending portion 315 that extends downwardly to a point where it will engage either side of the dog 253. An abutting engagement between the portion 315 and either face of dog 253 always occurs totally within a surface that is at right angles to the direction of relative movement between the dog 253 and switch 252. Accordingly, slight transverse movement of dog 253 relatively to the direction of the relative movement between it and switch 252 does not affect the point at which contact between 314 and the upper end of stem 299 occurs. Engagement between 315 and dog 253 in any other manner will introduce detrimental inaccuracies to the apparatus. Movement of the block 251 rightwardly as shown in Fig. 8 will cause the actuator 302 to pivot about the trunnion 307 adjacent shoulder 312 causing the arcuate surface 303 to force the plunger 298 upwardly against the action of spring 300. Upward movement of the plunger 298 causes abutting contact to be established between the contact 314 and the top of the stem 299, thereby grounding the circuit including the conductor 254 through the ground C'. Accordingly, no wiping action between contact 314 and the top of stem 299 occurs which, therefore, eliminates all wear between said contacts. Continued movement of the member 251 rightwardly permits the free passage of the unit over the dog 253 without affecting the operability of the switch because spring 313 yields and always returns contact 314 to its initial position in firm contact against the rigid body 251. Since the construction of the trunnions 306, 307 and the surfaces 310 are identical, movement of the member 251 leftwardly after it has passed the dog 253 causes depending portion 315 to engage dog 253 well within the surface of its righthand side and, therefore, causes an identical action of the switch 252, as previously described.

As previously stated, switches 252 consume very little space. In order that the combined unit including all switches 252 and dogs 253 will occupy a minimum of space, the micrometer adjusting means including the nuts 290 and the resiliently mounted wires 286 alternate in position with the fixed wires 285 in adjacent dogs 253. By this means, succeeding sets of wires 285, 286 can be located so close to each other that their respective adjusting mechanisms overlap.

There are as many switches 252 including plungers 298 and actuators 302 as there are switch-trip supporting means 238 to 245 inclusive; and there are as many switches 249, identical with switches 252, as there are switch-trip supporting means 229 to 236 inclusive. All of these switches 252 and 249 are identical, as well as each of the switch-trip supporting means.

Referring to Fig. 12, the turret head $H_t$ includes a turret 316 adapted to support a plurality of tools for movement into and out of engagement with work. The turret 316 is mounted for rotation on a stud 317 fixed to the slide 29. Normally the turret 316 is rigidly locked to the slide 29 and it is adapted to be power driven by a motor 318 fixed on the slide 29, all in the manner shown and described in application Serial Number 443,992, filed May 21, 1942, in the name of Edward P. Bullard, III, et al. now Patent Number 2,384,809, issued September 18, 1945. The turret 316 is adapted to be controlled from the function drum 170 by a double pole switch 319. The line $L_2$ is connected to one pole of the switch 319 and the corresponding pole thereof is connected by a conductor 320 to one side of the motor 318. The other side of said motor is connected to the line $L_1$. Usually, the turret 316 is indexed to present different tools to the work when no other movement of the slide 29 is being made. Accordingly, one of the index positions of the drum 170 is consumed by the function of indexing the turret 316. According, at the conclusion of the indexing of the turret 316, it is necessary that the drum be indexed to its next succeeding position in order to continue the cycle of operation. This is effected by the second portion of the switch 319. One pole of this second portion of switch 319 is connected to a conductor 321 that is connected to one side of a double pole switch 322. The corresponding pole of this switch is grounded. The corresponding pole of the second portion of switch 319 is connected to a conductor 323 that is in turn connected to the conductor 272 leading from the distributor 264. From the foregoing, it is evident that the placing of a dog on drum 170 in position to close switch 319 will, when effective, energize the motor 318 starting the indexing of turret 316. A disc 324 attached to the indexing mechanism for the turret 316 makes a single revolution during the indexing of turret 316 from one position to another. Near the completion of the revolution of disc 324, a cam 325 thereon closes switch 322 providing a ground connection through it, the conductor 321, the second portion of switch 319, conductor 323, conductor 272, switch 274, switch 276, conductor 278, source of energy G and solenoid 279, thereby operating valve 210 and indexing the drum 170. Ordinarily, upon the indexing of drum 170, switch 319 opens leaving switch 322 closed and in an improper position for subsequent indexing of the turret 316. However, the switch 322 also includes a portion 326 which is closed when cam 325 is effective. The closing of the portion 326 provides a circuit including line $L_2$, conductor 327, the portion 326 of switch 322, conductor 328, motor 318 and line $L_1$, continuing the rotation of the disc 324 until the cam 325 passes beyond its effective position relative to switch 322 effecting opening of the latter.

Often, the work to be performed by the machine utilizes less than the total number of longitudinal series of holes 171 on the drum 170 and before a succeeding cycle may be employed, the drum 170 must be indexed back to its starting position. This is accomplished in the present invention by providing a switch 329 in line with one of the circumferential series of openings 171. The one pole of switch 329 is grounded, while the other pole is connected to conductor 272 as previously described. Accordingly, a dog on drum 170 in line with switch 329, when effective, will form a circuit from the ground through the switch 329, conductor 272, switch 274, conductor 272, switch 276, conductor 278, source of energy G and solenoid 279, which circuit will operate the valve 210 to effect indexing of the drum 170.

The machine to which this control mechanism is applied is adapted manually to be operated independently of the automatic control. Furthermore, during the setting up of the machine, it is desirable to cause it to stop at the completion of any function. Additionally, in the event anything occurs which might damage the machine, it is desirable to stop the machine instantly. These three conditions, as well as a fourth condition of automatic run, are each rendered effective by the operation of a single, manually-operable control lever 330 rigid on a shaft 331, shown in section, and the length of which is represented by the center line 332. In the position shown in Figure 12, the apparatus is set for automatic run such that a cycle of operation set up on the drum 170 will automatically be performed by the successive indexing of the drum 170 which will occur only upon the completion of the last preceding function. The extent of each function is determined by the adjustment of the dogs 253 on the supporting means 229 to 236 and/or 238 to 245, both inclusive. Movement of the hand lever 330 to the position 333 will move the valve 213 to interrupt communication between lines 212 and 214. Upon the completion of the function being performed, energization of the solenoid 279 will operate the valve 210 to neutralize the operating structure of the apparatus through the action of the valves 221, but the drum 170 will not be indexed because of the interruption of the flow of fluid under pressure from line 212 to line 214. Movement of the hand lever 330 to the position 334 will cause a cam 335 on the shaft 331 to close a switch 336. One pole of the switch 336 is grounded and the other pole is connected to the conductor 278. Upon closing switch 336, the solenoid 279 is energized and the interruption between lines 212 and 214 is still effective. Accordingly, the machine instantly stops since energizing of the solenoid 279 operates the pistons 221 to exhaust the operating parts of the machine tool.

Movement of the hand lever 330 to the position 337 of Fig. 12 operates the valve 127 so that line 125 is connected to an exhaust 338 through the undercut portion 339 of said valve. This exhausts all the neutralizing mechanisms including that for the reversing clutch 40, the drop worm 36, the traverse arm 70 and the traverse arm 69. It also exhausts the line 128 such that all of the valve plungers 131 to 144 descend out of operative position so that the drum 170 may be indexed without causing operation of the machine. Additionally, movement of the handle 330 to the position 337 will operate valve 213 so that communication will be established between the line 212 and the line 214. Finally, with the hand lever 330 in the position 337, the cam 335 opens the lower portion of switch 274 and closes the upper two portions 274' and 274''. The portion 274' includes one pole that is connected to a push-button switch 339'. The opposite pole of portion 274' is connected to conductor 272. The opposite pole of push-button switch 339' is grounded. Accordingly, with handle 330 in position 337, closing push-button switch 339' will establish a circuit from ground through switch 339', portion 274', conductor 272, switch 276, conductor 278, generator G, solenoid 279 to ground, causing operation of valve 210 to index drum 170 without, however, supplying fluid under pressure to valve body 129.

The other portion 274" of switch 274 is in a circuit including a conductor 340 that is joined to line L₂. The other branch of this circuit comprises a conductor 341, a push-button switch 342 and another conductor 343 that is connected to motor 318 forming with line L₁ a complete circuit for said motor. Accordingly, with the lever 330 in the position 337 of Fig. 12, the entire machine may be operated manually by the hand levers previously described in connection with Figs. 1, 2, 6 and 7. The turret 316 may be indexed at the will of the operator by simply closing the push-button switch 342, and the function drum 170 may be indexed step by step by closing the push-button switch 339'.

*Operation*

In order to better understand the principles of operation of the invention, a very simple cycle of operation of the apparatus will be described. Referring to Figures 15 to 18, the turret head Ht is provided with four tools 344, 345, 346 and 347, one at each station of the turret. The work piece 348 is adapted to be machined by turning it to a specific diameter, rough facing the top, finish facing the top, and boring a hole centrally of the work. In setting up the apparatus, the first thing to do is to determine the successive functions required to produce the completed work and to attach dogs 172 at the correct locations in the successive longitudinally-disposed rows of holes 171 on drum 170 to cause said functions successively to be performed by the apparatus.

Referring to Figures 15 to 18, inclusive, the successive functions required to machine the work 348 are as follows:

1. Traverse turret 316 inwardly from a starting point.
2. Feed said head inwardly at a pre-determined rate in order to properly locate the tool 344 to turn the work 348 to a specific diameter.
3. Traverse head 316 downwardly to a point slightly above the work 348.
4. Feed the head downwardly at a desired rate in order to turn the work to size.
5. Traverse the turret outwardly.
6. Traverse the turret upwardly.
7. Index head 316 so that tool 345 is located in working position.
8. Traverse inwardly until tool 345 is spaced slightly outside of the periphery of the work.
9. Traverse downwardly until the tool 345 is located slightly above the work.
10. Feed downwardly to locate tool 345 for making the rough facing cut.
11. Feed inwardly to face the top of the work 348.
12. Traverse upwardly.
13. Index turret 316 to bring tool 346 into working position.
14. Traverse downwardly to a point slightly above the work 348.
15. Feed downwardly to size.
16. Feed outwardly, producing the finish cut on the top of the work 348.
17. Traverse upwardly.
18. Index the turret to bring the drill 347 into working position.
19. Traverse inwardly until the drill 347 is near the center of the work piece 348.
20. Feed inwardly to accurately locate the drill 347 at the center of the work piece 348.
21. Traverse downwardly until the drill is slightly above the work.
22. Feed downwardly to drill the hole 349.
23. Traverse upwardly.
24. Traverse outwardly to substantially the original starting position.
25. Index the turret 316 to bring the original tool 344 into working position.
26. Index the drum 170 from station to station until the last station is reached.

Figure 20:
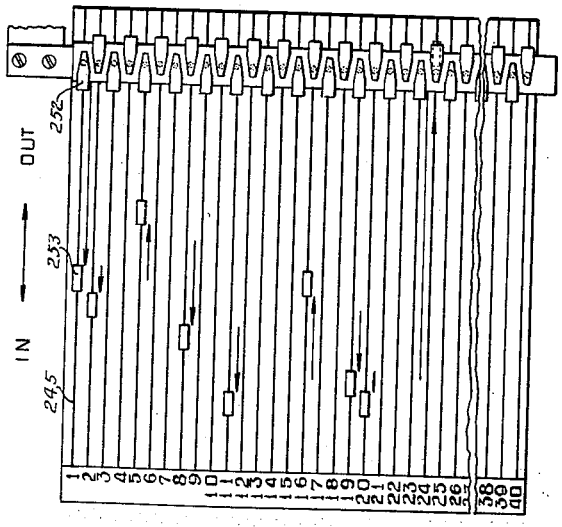
Figure 20 is a developed view of the function control drum with adjustable means set to cause the apparatus to produce a cycle of operation.

Figure 20 discloses the drum 170 in developed form having dogs 172 located at various stations to produce the above-listed functions in sequence. For example, the tenth function to be performed requires feeding the turret head downwardly to size at a proposed feed identified as the #3 feed. Accordingly, dog 172 is located in the tenth space of drum 170 beneath the index, "clutch 49 for out or down feed"; a dog 172 is also located beneath the index, "form 36 for up or down feed"; a dog 172 is located beneath the index, "feed 3"; and a dog 172 beneath the index, "feed A". These four dogs 172 located in the tenth space on the drum 170 will cause the turret head 316 to move downwardly at a feed rate designated as "feed 3." The dog beneath the index "feed A" is necessary to move the key 48 into engagement with the gear 46. Absence of a dog beneath the index "feed A" means that the key 48 is in engagement with the gear 45.

The twenty-sixth space of the drum 170 and every space thereafter to, but excluding the fortieth, includes a single dog beneath the index, "drum index." This causes the drum 170 to automatically index from station to station at the conclusion of the automatic cycle operation to the last station of the drum where it comes to rest, thereby arranging the drum 170 in position to begin a new cycle of operation by merely depressing the starting switch 269 (Fig. 12).

Figure 19:
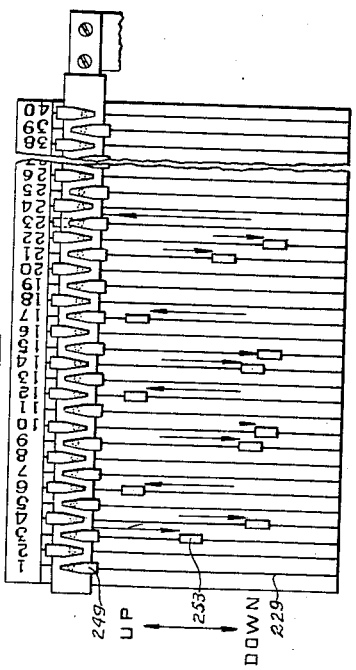
Figure 19 shows an enlargement of a portion of Figure 1 with adjustable means set to cause the apparatus to produce a cycle of operation.

Figure 19 discloses in enlarged form, the switches 249, 252 and the arrangement of the adjustable dogs 253 on the switch-trip supporting means 229, etc., and 238, etc. With the drum 170 pre-set with the dogs 172 as just described, the work 348 chucked to the table W and the drum 170 at its last or fortieth station, the operator places the handle 330 (Fig. 12) in the position shown in solid lines and closes starting switch 269. Closing switch 269 energizes solenoid 279 actuating valve 210, causing drum 170 to be indexed to the No. 1 station containing the dogs for effecting inward traverse movement of the turret head 316. When the tool head has traversed inwardly to a point a short distance from the outer peripheral edge of the work, the operator moves the hand lever 330 to the position 334 whereupon the head 316 instantly stops. A dog 253 on the supporting means 245 is then adjusted relatively to the switch 252 above it such that the switch 252 will close slightly before the head reaches the desired point. This leeway is provided in traverse movement to compensate for the over-travel due to the high rate of speed of the head.

The operator then moves the hand lever 330 to the position 337 rendering the apparatus capable of manual operation. Referring to Fig. 1, the traverse hand lever 71 is then moved to the right, causing the head Ht to traverse outwardly away from the work. The operator then moves the handle 330 to the position 333 causing the turret head Ht to move inwardly at traverse speed until switch 252 is operated, whereupon head H_t stops, but the drum 170 is not indexed to its station No. 2 because position 333 of handle 330 is "automatic stop" which permits neutralizing the apparatus but prevents indexing of drum 170. This permits the operator to make sure that the head will stop at the point he wishes. Movement of the hand lever 330 to the solid line position shown in Fig. 12 instantly causes indexing of the drum 170 to the No. 2 station which contains dogs 172 causing feeding of the turret 316 inwardly at the No. 1 feed rate. This is permitted to continue until the tool 344 has moved to a point where its cutting tip is within the boundary of the work 348 sufficiently to perform a machining operation, at which point the handle 330 is moved to the position 334 causing instant stopping of the feeding movement of the turret. The extent of this inward feed should always be less than the final amount necessary to machine the work to size. That is, the initial cut should produce oversize work rather than undersize work. A dog 253 on the No. 2 supporting means beneath a switch 252 is adjusted so that its right-hand side contacts the left-hand side of the depending element 315 of switch 252 (Fig. 8).

The hand lever 330 is then positioned in the solid line position of Fig. 12 whereupon the drum 170 instantly indexes to the third station at which dog 172 is located for effecting downward traverse movement of the head H_t. This downward movement is continued until tool 344 is a small distance above work 348 at which time the handle 330 is moved to the position 334, thereby instantly stopping the downward movement of the tool 344. The adjustable dog 253 on the support No. 3 beneath a switch 249 is then adjusted so that it has just effected closing of the switch 249. Lever 330 is then moved to the position 337 and the handle 72 (Fig. 1) is moved leftwardly causing upward traverse movement of the turret 316 a short distance. Handle 330 is then placed in position 333, Fig. 12, whereupon the head H_t moves downwardly in traverse speed until switch 249 is closed by the dog 253 on the support No. 3 therefor, at which time the head H_t stops and the function drum 170 does not index. This permits the operator to check the point at which the head stops its downward traverse movement.

The hand lever 330 is then moved to the solid line position shown in Fig. 12, whereupon the drum 170 instantly indexes to its fourth station containing dogs 172 which effect downward feeding of the tool 344 at the No. 3 speed rate. This downward feeding causes actual machining of the work 348 and is continued a desired amount, at which point the operator moves the handle 330 to the position 334, causing instant stopping of the head H_t. A dog 253 on the No. 4 supporting means beneath the switches 249 is then adjusted to effect closing of the switch 249 and locked in position. The head H_t is then raised a slight amount and the handle 330 is positioned at point 333, Fig. 12, causing downward feed of the tool 344 the desired amount at which time the head H_t stops, but the drum 170 is not indexed to the next station. At this point, the operator accurately measures the diameter of the work 348 which has been machined by the downward feed of the tool 344. Usually, it is necessary to remove additional metal from the work 348 to produce the exact diameter required. The operator must then move the dog 253 on the No. 2 support under the switches 252 to the left an amount equal to one-half the difference between the actual diameter of the work and the desired diameter. This is accomplished by turning the micrometer head 290 (Fig. 8) in the correct direction. As previously described, the micrometer head 290 is provided with 40 threads per inch that mesh with the threads 289 on the rod 286. Accordingly, one revolution of the head 290 will cause $\frac{1}{40}$ of an inch movement of the rod 286 and with it the dog 253. A dial is provided for each of the heads 290 that will permit very fine adjustments of the dog 253 similar to the operation of a micrometer. Having made this adjustment, the lever 330 is positioned in the position 337 in Fig. 12 and the head H_t is moved upwardly and outwardly to a point near the starting point. The push-button switch 339' is held closed causing the drum 170 to be rapidly indexed from station to station until it reaches its last station, when the lever 330 is returned to its solid line position in Fig. 12 and the starting button 269 is closed, whereupon the head H_t traverses inwardly; then feeds inwardly to the new adjusted location; traverses downwardly; and feeds downwardly to perform the adjusted machining operation. While the adjusted machining operation is in progress, the hand lever 330 is moved to position 333 so that upon its completion, the head H_t will stop, but the drum 170 will not be indexed to its next station. The operator may then accurately measure the diameter of the work, and if further adjustment is required or further removal of metal is required, the previous procedure is employed until the work has been accurately machined to size.

Assuming that the diameter of the work 348 is accurate, the lever 330 is moved to its solid line position in Fig. 12 causing the drum 170 to index to its fifth station containing a dog 172 located in position to cause outward traverse movement of the head H_t. When the head H_t has traversed outwardly sufficiently so that the tool 344 adequately clears the work, the operator moves lever 330 to the position 334 instantly stopping the movement of the head H_t. The dog 253 on the fifth support beneath a switch 252 is then adjusted so that it closes the switch 252 above it, whereupon it is locked in position on the support. The hand lever 330 is then moved to its solid line position causing instant indexing of the drum 170 to station No. 6 containing a dog 172 that effects upward traverse movement of the head H_t until the tool 344 is sufficiently above the work 348, so that upon indexing the head H_t the tool 345 will not interfere with the work 348. At this point, the hand lever 330 is moved to the position 334 instantly stopping the upward traverse movement of the head H_t. The dog 253 on the No. 6 support beneath a switch 249 is then adjusted to effect closing of the switch 249 above it and the dog is then locked in position on its support. The hand lever 330 is then moved to its solid line position in Fig. 12, causing instant indexing of the drum 170 to its station No. 7 at which a dog 172 is located for effecting the indexing of the turret H_t, whereupon the tool 345 is moved into position to effect further work on the work piece 348.

The procedure just described is carried out until all operations as dictated by the setting of dogs 172 on the drum 170 have been completed. Should the number of functions be less than the number of stations of the drum 170, the remaining stations contain dogs 172 beneath the "drum indexing" switch 329 (Fig. 12) so that at the conclusion of the operation of the work 348, the drum 170 is indexed to the last station thereof, setting the apparatus in condition to repeat the operation on a succeeding work piece.

After the apparatus has been set as above described, it is only necessary to remove the finished work piece, replace it with a rough piece, chuck it to the table W and close the starting switch 269 (Fig. 12). The work piece 348 is then completely and accurately machined in accordance with the pre-determined cycle of operation, and the apparatus comes to rest upon the completion of the machining thereon.

Although the various features of the improved control mechanism have been shown and described in detail to fully disclose one embodiment of the invention, it will be evident that numerous changes may be made in such details, and certain features can be used without others, without departing from the principles of the invention.

What is claimed is:

1. In a machine tool including a movable member, means for moving said member; an electrical circuit comprising in series arrangement, a source of voltage; an operating means adapted to be energized by said source of voltage for rendering ineffective said moving means; contact means adapted to be closed at any desired rate by the action of said movable member for energizing said circuit to thereby render effective said operating means; and other contact means adapted to be opened incident to the action of said operating means for de-energizing said circuit while said first-mentioned contact means remains closed.

2. In a machine tool including a movable member, means for moving said member; an electrical circuit comprising in series arrangement, a source of direct current; an operating means adapted to be energized by such source of direct current for rendering ineffective said moving means; contact means adapted to be closed at any desired rate by the action of said movable member for energizing said circuit to thereby render effective said operating means; and other contact means adapted to be opened incident to the action of said operating means for de-energizing said circuit while said first-mentioned contact means remains closed.

3. In a machine tool including a movable member, means for moving said member; an electrical circuit comprising in series arrangement, a source of voltage; operating means adapted to be energized by said source of voltage for rendering ineffective said moving means; an electrical distributor including a plurality of contacts, one for each point within a cycle of operations of said movable member at which said member is adapted to be stopped, and an arm adapted to be indexed from position to position for successively connecting said contacts into said series circuit; a plurality of contact means adapted to be closed at any desired rate by the action of said movable member for energizing said circuit, at least one of said contact means being provided for each of said distributor contacts, and each adapted successively to be connected into said series circuit simultaneously with its corresponding distributor contact; and means for moving said distributor arm from one contact to the next succeeding contact upon the closing of the contact means for said one contact thereby to de-energize said series circuit while said contact means for said one contact remains closed.

4. In a machine tool including a movable member, means for moving said member; an electrical circuit comprising in series arrangement, a source of voltage; an operating means adapted to be energized by said source of voltage for rendering ineffective said moving means; an electrical distributor including a plurality of contacts, one for each point within a cycle of operations of said movable member at which said member is adapted to be stopped, and an arm adapted to be moved from position to position for successively connecting said contacts into said series circuit; a plurality of sets of contact means each set including a plurality of contacts arranged in parallel relation relatively to each other, and at least one set being provided for each of said distributor contacts, and each contact being adapted to be closed at any desired rate by the action of said movable member for energizing said series circuit; and means for moving the arm of said distributor from one of its contacts to its next succeeding contact upon the closing of any of said parallel arranged contacts corresponding to said one contact to thereby de-energize said circuit while said parallel arranged contact for said one contact remains closed.

5. Apparatus comprising in combination, a member; means for causing said member to perform a plurality of functions; means adapted to be indexed from station to station and adjustably to be pre-set to cause said member to perform a plurality of functions within a cycle of operation; an electrical circuit including in series arrangement, a source of voltage; an operating means adapted to be energized upon energization of said series circuit for causing said pre-settable means to be indexed from one station to its next succeeding station; an electrical distributor including a plurality of contacts, one for each station to which said indexable means is adapted to be moved, and an arm adapted to be indexed from contact to contact for successively connecting the distributor contacts into said series circuit; a plurality of adjustable contact means, one for each of said distributor contacts and each adapted to be closed at any desired rate by the action of said function performing member for energizing said series circuit to thereby energize said operating means; and means for moving the distributor arm from one of its contacts to its next succeeding contact when the contact means corresponding to said one contact of said distributor is closed for deenergizing said series circuit while said contact means for said one contact of said distributor remains closed.

6. Apparatus comprising in combination, a member; means for causing said member to perform a plurality of functions; means adapted adjustably to be pre-set to cause said member successively to perform a plurality of functions within a cycle of operation; an electrical circuit including in series arrangement, a source of voltage; a distributor having a plurality of contacts, one for each function within said cycle of operation, and an arm adapted to be moved from contact to contact for successively connecting said distributor contacts into said series circuit; a frame; a plurality of supporting means mounted in said frame, one for each of said distributor contacts; dog means adjustably attached to each of said supporting means; a plurality of contact means, one for each of said dog means and each located in cooperating position relatively to its dog means; means for providing relative motion between said plurality of contact means and said frame in proportion to the movement of said member for causing said adjustable dog means to close their corresponding contact means; and means for moving said distributor arm from one of its contacts to its next succeeding contact upon closing of the contact means for said one contact of said distributor for de-energizing said series circuit while said contact means for said one contact of said distributor remains closed.

7. In a machine tool including a movable member, means for moving said member; an electrical circuit including in series arrangement, a source of voltage; contact means; means operable by the action of said movable member for closing said contact means to energize said circuit; means operated by the energization of said circuit for rendering ineffective said moving means; and means for de-energizing said circuit prior to opening said contact means.

8. In a machine tool including a movable member, means for moving said member; an electrical circuit comprising in series relation, a source of direct current; electrically-operated means adapted upon energization of said circuit to render ineffective said moving means; contact means; means operated by the action of said movable member for closing said contact means at any desired rate to energize said circuit; and means for de-energizing said circuit while said contact means remains closed.

9. In a machine tool including a movable member, means for moving said member; an electrical circuit comprising in series relation, a source of voltage; electrically-operated means adapted upon energization of said circuit to render ineffective said moving means; contact means; means operable by the action of said movable member for closing said contact means at any desired rate for energizing said circuit; and means for de-energizing said circuit and operable by said electrically-operated means while said contact means is closed.

10. In a machine tool including a movable member, means for moving said member; means for rendering ineffective said moving means to thereby effect stopping of the movement of said member; an electrical circuit comprising in series relation, a source of voltage; a plurality of contact means; means for successively connecting and disconnecting said contact means into and from said series circuit; means operable by the action of said movable member for closing each of said contact means for energizing said circuit when it is connected into said circuit; and means for operating said connecting and disconnecting means to include the next succeeding contact means in said circuit and to exclude therefrom said last preceding contact means while it remains closed.

11. In a machine tool including a movable member, means for moving said member; an electrical circuit comprising in series relation, a source of direct current; a plurality of contact means; means for successively connecting and disconnecting said contact means into and from said series circuit; means operable by the action of said movable member for closing each of said contact means for energizing said circuit when it is connected into said circuit; means operable upon energization of said circuit for rendering ineffective said moving means; and means for operating said connecting and disconnecting means prior to the opening of the contact means that energized said circuit.

12. In a machine tool, a tool support adapted to be moved along a path for performing a metal-working operation; means for moving said tool support along said path; electric-contact means adapted upon being closed to render ineffective said moving means; a resiliently-mounted support; a member mounted on said support and adapted adjustably to be fixed thereto; a micrometer attachment associated with said support to accurately adjust the position of said member in space; and means for providing relative motion between said member and said electric-contact means proportional to the movement of said tool support for causing cooperation between said member and said electric-contact means to render ineffective said moving means.

13. In a machine tool, a tool support adapted to be moved along a path for performing a metal-working operation; means for moving said tool support along said path; electric-contact means adapted upon energization to render ineffective said moving means; a supporting rod; a frame for holding said supporting rod; a member releasably fixed to said supporting rod; a micrometer head threaded to one end of said rod and adapted to abut against said frame; resilient means normally urging said micrometer head against said frame; means for providing relative movement between said electric-contact means and said frame proportional to the movement of said tool support; and means for energizing said electric-contact means by the cooperation between it and said member for rendering ineffective said moving means.

14. In a machine tool, a tool support adapted to be moved along a path for performing a metal-working operation; means for moving said tool support along said path; a device adapted upon operation to render ineffective said moving means; a frame; a fixed guide-rod mounted in said frame; a member slidably mounted on said fixed guide-rod; another rod in said frame, extending through said member; means for releasably fixing said member to said other rod; a micrometer head threaded to one end of said other rod and adapted to abut against said frame; resilient means normally urging said micrometer head against said frame; and means providing relative movement between said device and said frame in proportion to the movement of said tool support, whereby said member will operate said device to render ineffective said moving means.

15. In a machine tool, a tool support adapted to be moved along a path a plurality of times within a cycle of operation for performing metal-working operations on work; means for moving said tool support along said path; a plurality of devices each adapted to be operated for rendering ineffective said moving means; a plurality of resiliently mounted supports, one for each of said plurality of devices; a member slidably mounted on each of said supports in abutting alignment relatively to its corresponding device and adapted adjustably to be fixed thereto, adjacent supports adapted to pass through their members at different locations; a micrometer attachment associated with each of said supports for accurately adjusting the position of said members in space; and means for providing relative movement between said devices and said members proportionally to the movement of said tool support, whereby said devices are operated to render ineffective said moving means.

16. Apparatus comprising in combination, a member; means for causing said member to perform a plurality of functions; means adapted adjustably to be pre-set to cause said member to perform a plurality of said functions in any order in a cycle of operation; means for terminating each of said functions; an electrical circuit including in series arrangement, a source of voltage; an operating means adapted to be energized upon energization of said series circuit for rendering effective said function-terminating means; contact means adapted upon being closed to energize said circuit; means responsive at any point within each of said functions for closing said contact means; and other contact means within said series arrangement adapted to be opened upon energization of said operating means.

17. Apparatus comprising in combination, a member; means for causing said member to perform a plurality of functions; means adapted adjustably to be pre-set to cause said member to perform a plurality of said functions in any order within a cycle of operation; means for terminating each of said functions; a support; an element releasably fixed to said support; means for accurately locating said element by adjusting said support; an electrical circuit including in series arrangement, a source of voltage; an operating means adapted to be energized upon energization of said series circuit for rendering effective said function-terminating means; contact means adapted to be closed by the action of said element at any point throughout the extent of the functions of said member for energizing said circuit; and another contact means adapted to be opened by said operating means for de-energizing said circuit while said first-mentioned contact means remains closed.

18. Apparatus comprising in combination, a member; means for causing said member to perform a plurality of functions; means adapted adjustably to be pre-set to cause said member successively to perform a plurality of said functions within a cycle of operation; means for terminating said functions; a frame; a plurality of supporting means mounted in said frame, one for each function to be performed within said cycle of operation; an element adjustably attached to each of said supporting means; an electrical circuit including in series arrangement, a source of voltage; a plurality of contact means, one for each of said elements, each located in cooperating position relatively to its element and each adapted upon being closed to energize said circuit for rendering effective said function-terminating means; a distributor including a plurality of contacts, one for each of said contact means, and an arm adapted to be moved from position to position for successively connecting said distributor contacts and their corresponding contact means into said series circuit; means for providing cooperation between said elements and said contact means by the action of said member, whereby the contact means that is connected into said circuit is closed by its corresponding element to energize said circuit; and means for moving said distributor arm to its next succeeding contact upon energization of said circuit while the contact that was closed to energize said circuit remains closed.

19. Apparatus comprising in combination, a member; means for moving said member in either direction along a plurality of paths; means adapted adjustably to be pre-set to cause said member to be moved in either direction along said paths a plurality of times within a cycle of operation; an electrical circuit including in series arrangement, a source of voltage; an operating means adapted to be energized upon energization of said series circuit for rendering ineffective said moving means; a plurality of sets of parallel arranged contact means each set including a contact for each path of movement along which said member is adapted to be moved, and a set for each movement of said member along said paths within said cycle of operation; a distributor including a plurality of contacts, one for each set of the parallel arranged contact means; an arm for said distributor adapted to be moved from position to position for successively connecting said distributor contacts and their corresponding sets of parallel arranged contacts into said series circuit; means movable in proportion to the movement of said member for closing the contact means that is connected into said series circuit thereby to energize said circuit; and means rendered effective upon energization of said series circuit for moving said distributor arm to its next succeeding contact to de-energize said circuit while the contact that was closed to energize the circuit remains closed.

20. In a machine tool, a tool support adapted to be moved along a path a plurality of times within a cycle of operation for performing metal-working operations; means for moving said tool support along said path; an electrical circuit including in series arrangement, a source of voltage; an operating means adapted to be energized upon energization of said circuit for rendering ineffective said moving means; a plurality of electrical switches one for each movement of said tool support within said cycle of operation, each switch including single contact means and contact-closing means; a frame; a plurality of supports mounted in said frame, one for each of said switches; a member slidably mounted on each of said supports; means for releasably fixing said members to their supports in cooperating position relatively to their respective electrical switches; means for providing relative motion between said switches and said frame; and means for rendering a switch effective for each succeeding movement of said tool support within said cycle of operation.

21. In a machine tool, a tool support adapted to be moved along a path a plurality of times within a cycle of operation for performing metal-working operations; means for moving said tool support along said path; an electrical circuit including in series arrangement, a source of voltage; an operating means adapted to be energized upon energization of said circuit for rendering ineffective said moving means; a plurality of electrical switches one for each movement of said tool support within said cycle of operation, each switch including single contact means and contact-closing means; a frame; a plurality of supports mounted in said frame, one for each of said switches; a member slidably mounted on each of said supports; means for releasably fixing said members to their supports in cooperating position relatively to their respective electrical switches; means for providing relative motion between said switches and said frame; means for providing an abutting engagement between said members and the contact-closing means of their respective switches within a surface that is at all times maintained at right angles to the direction of said relative movement; and means for rendering a separate switch effective for each succeeding movement of said tool support within said cycle of operation.

22. In a machine tool, a tool support adapted to be moved along a path a plurality of times within a cycle of operation for performing metalworking operations; means for moving said tool support along said path; an electrical circuit including in series arrangement, a source of voltage; an operating means adapted to be energized upon energization of said circuit for rendering ineffective said moving means; a plurality of electrical switches one for each movement of said tool support within said cycle of operation; a single contact for each switch including a part resiliently urged against a rigid support; a rigid part movable relatively to said rigid support; a pivotally-mounted rigid member maintained in contact with said rigid part at all times; a frame; a plurality of supports mounted in said frame, one for each of said switches; a member slidably mounted on each of said supports; means for releasably fixing said members to their supports in cooperating position relatively to their respective switches; means for providing relative motion between said switches and said frame; and means for rendering a separate switch effective for each succeeding movement of said tool support within said cycle of said operation.

EDWARD P. BULLARD, III.

REFERENCES CITED

The following references are of record in the file of this patent:

UNITED STATES PATENTS

| Number | Name | Date |
|---|---|---|
| 528,242 | Waddell | Oct. 30, 1894 |
| 683,592 | Bullard, Jr. | Oct. 1, 1901 |
| 1,754,441 | Sachs | Apr. 15, 1930 |
| 1,987,726 | Wilkerson et al. | Jan. 15, 1935 |
| 2,065,859 | Kirk | Dec. 29, 1936 |
| 2,106,965 | Wright et al. | Feb. 1, 1938 |
| 2,116,376 | Anderson | May 3, 1938 |
| 2,133,545 | Krieger | Oct. 18, 1938 |
| 2,255,739 | Curtis | Sept. 9, 1941 |
| 2,289,957 | Godfriaux | July 14, 1942 |
| 2,352,183 | Bullard | June 27, 1944 |
| 2,352,185 | Bullard et al. | June 27, 1944 |
| 2,355,625 | Bullard et al. | Aug. 15, 1944 |
| 2,427,493 | Bullard, 3d | Sept. 16, 1947 |